M. E. DEARING.
HEAT RETAINER FOR WATER HEATERS.
APPLICATION FILED NOV. 8, 1918.
1,417,888.
Patented May 30, 1922.
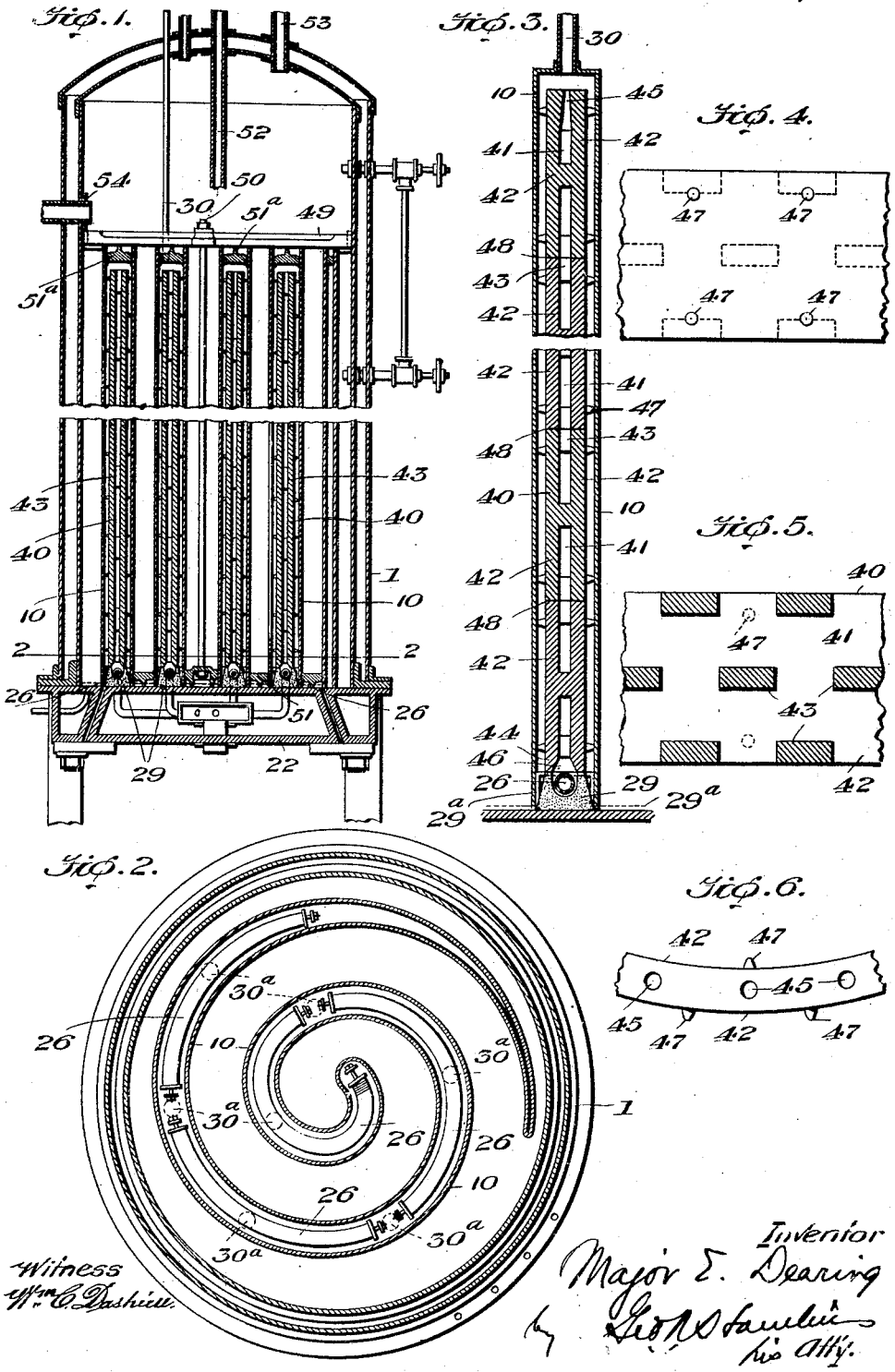

UNITED STATES PATENT OFFICE.

MAJOR E. DEARING, OF SALT LAKE CITY, UTAH.

HEAT RETAINER FOR WATER HEATERS.

1,417,888. Specification of Letters Patent. Patented May 30, 1922.

Application filed November 8, 1918. Serial No. 261,742.

*To all whom it may concern:*

Be it known that I, MAJOR E. DEARING, a citizen of the United States, residing at Salt Lake City, in the county of Salt Lake and State of Utah, have invented certain new and useful Improvements in Heat Retainers for Water Heaters, of which the following is a specification.

This invention relates to heat retainers for water heaters and is an attachment adapted for use in connection with the apparatus for heating water set forth in my patent No. 1,223,674, dated April 24, 1917. The present invention in heat retainers is not restricted to use in connection with the water heater of my aforesaid patent but is adapted for application to any water heater employing a tube, cell, drum, or other hollow heating element from which heat is directed into adjacent water.

My object is to provide a novel heat retainer, adapted to be disposed within the cell or other hollow heating element, which will absorb a sufficient amount of the heat delivered to the interior of the cell or the like to insure the maintenance of the requisite temperature for the purpose of properly heating the water after the supply of heat to the cell has been cut-off. A thermostat may be employed in connection with the heat-producing means which will automatically cut off the heat when the requisite temperature has been attained and, thereafter, radiation of the heat absorbed by the heat retainer will be sufficient, for a period of time, to keep the water at a suitable temperature. Such a thermostat will automatically cut-in the heat when the heat retainer radiates to sufficient extent to require further heat absorption. The disposition of the heat retainer insures its intercepting the heat which is to be radiated from the heating cell into the water to a sufficient extent to raise the temperature of the retainer nearly as high as that of the heating element or means. Consequently, with suitable thermostatic control, it is necessary to use only sufficient heat to raise the water to a certain temperature and to maintain this temperature at minimum cost. When the heat retainer is used in connection with a water heater such as set forth in my Patent No. 1,223,674 where the construction allows only a minimum loss through radiation, it is possible to keep the water hot until it is draw off. Furthermore, by using my heat retainer and preventing the water from coming to the boiling point, the lime deposits in the water cells are reduced to a minimum, which is of particular advantage in those localities where the local water supply contains lime and other minerals in suspension which are precipitated when the water is boiled.

When the present invention is used in connection with the water heater of my patent aforesaid, the thermostatic control may be employed to open a switch and cut off the electric current to the resistance heating elements. Such thermostatic control may be used in connection with any heat producing means employed. The thermostatic control forms no part of the present invention and is neither illustrated nor specifically described, as my invention is not restricted to use with a thermostatic control. For instance, while a thermostatic control of any desired kind may be useful when the invention is used in connection with a water heater such as would be employed in a barbershop, or for hospital or domestic use, to conserve heat production as fully as possible, nevertheless the heat retainer of the present invention can be used to great advantage with any water heater or in the flues of a boiler heated by coal, oil, gas, or wood as the retainer will discharge its absorbed heat and keep up temperature for a considerable time after the heating means has been permanently shut off manually or automatically.

The invention is susceptible of modification and, hence, the embodiment described and shown in the accompanying drawings is to be considered as illustrative, rather than restrictive, of the scope thereof.

In the accompanying drawings:

Figure 1, is a vertical section of a water heater of the class set forth in my Patent No. 1,223,674 equipped with my present invention;

Fig. 2, a section on line 2—2, Fig. 1, the heat retainer being omitted.

Fig. 3, a detail vertical section through the heating cell, showing the heat retainer therein;

Fig. 4, a detail side view of a portion of the heat retainer;

Fig. 5, a detail vertical section thereof; and

Fig. 6, a detail plan view thereof.

The invention is illustrated in connection with a water heater, such as shown in my Patent No. 1,223,674, whose parts require no description. A convolute heater or sealed shell of the class of that patent appears at 10, the resistance units at 26 which are supported by the insulating blocks or bed pieces 29, in turn carried by the removable section 22.

There is provided for the convolute cell or heater 10 a vent pipe 30 leading from the top of the cell through the top of the shell of the heater. This vent pipe allows escape of moisture caused by condensation or sweating inside the cell 10 when the heat is first turned on by admitting electric current to the resistance units 26, the water being then cold. The vent also voids the air within the cell 10 as the heat rises. Branch vent pipes to different parts of the cell may be used, as indicated by dotted circles 30ª, Fig. 2.

The heat retainer 40 may be of any suitable material adapted to readily absorb and retain heat; fire clay or grey iron I have found to be well adapted for use in this retainer, particularly grey iron.

The heat retainer is hollow, as shown at 41, the vertical, parallel walls 42 thereof being connected at intervals by horizontal, staggered cross-pieces 43 which baffle the heat rising from the resistance units 26 to thereby obtain the full heating effect as the heat rises in the convolute cell or heater 10. At the bottom, the heat retainer has the parts 44 (Fig. 3) which straddle the resistance units 26 and are in contact with the insulating blocks or bed pieces 29. The heat retainer is held in position by spider braces 29ª put in the cell 10 after the retainer 40 is in place and then bolted to the bottom of cell 10. At the top, the heat retainer has the vents or air spaces 45 which permit the heat rising within the retainer to pass into the extreme upper part of the cell 10. At the bottom, the air spaces 46 between the walls of the heat retainer, admit the heat into the hollow interior of the latter.

Projecting from the opposite outer faces of the heat retainer are nibs, lugs, or spacers 47 which are integral with the walls 42 and are arranged and adapted to space the walls 42 from the walls of the cell 10 and prevent contact therebetween, thus allowing free spaces on both sides of the heat retainer for the circulation of the heat and to allow it to radiate freely. Preferably, the width of the retainer and the extent of projection of the nibs or lugs 47, will enable the retainer to be freely, yet relatively snugly, introduced between the walls of the cell 10, or removed therefrom. Preferably, the retainer is made in horizontal sections, each of which may be of any desired length. These sections are stacked one on top of the other, as shown in Fig. 3, where the horizontal abutting faces thereof where they rest on each other, are shown at 48. A portion of a section is shown in Figs. 4, 5, 6. Making the heat retainer in sections facilitates its manufacture and its setting up and taking down, besides rendering substitution of a damaged section an easy and inexpensive matter.

The cell 10 and heat retainer 40 are suspended by a spider 49, suitably supported from the shell 1 of the heater, and a bolt 50 engaged with a head 51. There is a head 51ª at the top of the cell 10.

A water feed pipe 52 extends to the lower portion of the shell 1; a steam or hot water outlet pipe appears at 53. Valves are provided for all pipes.

My heat retainer may be made in such form that it can be applied to a cell of any form, such as concentric, semi-circular, tubular cells, as well as the convolute cell which is illustrated. It may be used in the flues of a water heater or boiler. It may be of sectional form, or complete in one piece. The arrangement of the spider and heads which connect the walls of the retainer can be varied; modifications in the form of the lugs or nibs may be resorted to, and other changes made without departing from the spirit and scope of the invention.

No thermostatic control of the heat supplied to the cell 10 is shown or described. If such thermostatic control is desired, it may be employed at the point 54, for instance, although it forms no part of the invention.

What I claim is:

1. In a heater, the combination with an upright sealed hollow heating element, of means for venting the upper end of said sealed hollow heating element, a hollow heat retainer wholly contained within said hollow heating element, and means for supplying heat to the interior of said hollow heat retainer.

2. In a heater, the combination with an upright sealed hollow heating element, of means for venting the upper end of said sealed hollow heating element, a hollow heat retainer wholly contained within said hollow heating element, said heat retainer being open at its lower part to receive heat from a suitable source and also having an opening in its upper part communicating with the interior of the hollow heating element for discharging the heat thereinto, and means for supplying heat to the interior of said hollow heat retainer.

3. In a heater, the combination with an upright sealed convolute hollow heating element, of an upright hollow convolute heat retainer wholly contained therein having an opening communicating with the interior of the hollow heating element, and means for supplying heat to the interior of said hollow convolute heat retainer.

4. In a heater, the combination with an upright sealed convolute hollow heating element, of a sectional hollow convolute heat retainer wholly contained therein, comprising hollow internally communicating units arranged face to face on top of each other, said heat retainer being open at its lower part to receive heat from a suitable source and also having an opening at its upper end communicating with the interior of the hollow heating element for discharging the heat thereunto, and means for supplying heat to the interior of said heat retainer.

5. In a heater, the combination with a hollow sealed heating element, of a hollow heat retainer wholly contained within said sealed heating element which is provided with internal, tortuous heat conducting channels and with means for discharging heat therefrom into the interior of the heating element.

6. In a heater, the combination with a hollow heating element, of a heat retainer located inside the hollow heating element and composed of hollow units placed end to end whose walls are spaced or separated from the interior walls of the hollow heating element, each unit having internal baffles.

7. In a heater, the combination with a hollow upright sealed heating element, of a hollow upright heat retainer wholly contained within said hollow heating element and adapted to be internally heated itself and having an opening in its upper part for discharging heat into the hollow heating element, said heat retainer being provided with lugs or projections on its exterior which prevent the walls of the heat retainer from contacting with the interior walls of the hollow heating element.

In testimony whereof I affix my signature.

MAJOR E. DEARING.